(12) United States Patent  
Yang et al.

(10) Patent No.: US 9,757,824 B2  
(45) Date of Patent: *Sep. 12, 2017

(54) METHOD FOR MACHINING METALLIC MEMBER USING LATHING AND SCRAPING

(71) Applicants: FU DING ELECTRONIC TECHNOLOGY (JIASHAN) CO., LTD., Zhejiang (CN); HON HAI PRECISION INDUSTRY CO., LTD., New Taipei (TW)

(72) Inventors: Ming-Lu Yang, New Taipei (TW); Tian-En Zhang, Jiashan (CN); Wei-Chuan Zhang, Jiashan (CN); Jian-Shi Jia, Jiashan (CN); Yang-Mao Peng, Jiashan (CN); Jian Qu, Jiashan (CN); Feng-Hua Chen, Jiashan (CN); Zhen-Guang Xu, Shenzhen (CN); Jing-Shuang Sui, Jiashan (CN); Da-Qing Zhuang, Jiashan (CN); Jie Li, Jiashan (CN); Yi Liu, Jiashan (CN); Jian-Min Yu, Jiashan (CN)

(73) Assignees: FU DING ELECTRONICAL TECHNOLOGY (JIASHAN) CO., LTD., Jiashan (CN); HON HAI PRECISION INDUSTRY CO., LTD., New Taipei (TW)

(*) Notice: Subject to any disclaimer, the term of this patent is extended or adjusted under 35 U.S.C. 154(b) by 200 days.

This patent is subject to a terminal disclaimer.

(21) Appl. No.: 14/070,688

(22) Filed: Nov. 4, 2013

(65) Prior Publication Data

US 2014/0165373 A1 Jun. 19, 2014

(30) Foreign Application Priority Data

Dec. 19, 2012 (CN) .......................... 2012 1 05538219

(51) Int. Cl.  
*B23P 23/02* (2006.01)  
*B23P 13/02* (2006.01)

(52) U.S. Cl.  
CPC ............... *B23P 13/02* (2013.01); *B23P 23/02* (2013.01); *Y10T 29/49996* (2015.01)

(58) Field of Classification Search  
CPC ......... Y10T 29/49995; Y10T 29/49996; Y10T 409/50082; Y10T 409/509184; Y10T 409/50492  
See application file for complete search history.

(56) References Cited

U.S. PATENT DOCUMENTS 8,529,420 B2 * 9/2013 Meidar ................. B23Q 1/012  
29/33 P  
2006/0270540 A1 * 11/2006 Takayama et al. ............. 483/41

FOREIGN PATENT DOCUMENTS

| CN | 101959639 A | 1/2011 |
|---|---|---|
| JP | 2008-183666 A | 8/2008 |
| TW | M355140 U | 4/2009 |

* cited by examiner

Primary Examiner — Jason L Vaughan  
Assistant Examiner — Amanda Meneghini  
(74) Attorney, Agent, or Firm — Steven Reiss

(57) ABSTRACT

A method for machining a metallic member to provide a finished appearance uses a lathe and a scraping process. A metallic member comprising a top portion and a peripheral sidewall is provided, the metallic member is positioned on the worktable. The worktable is rotated with the metallic member, the lathe tool moved backwards and forwards to machine the top portion of the rotary metallic member circumferentially. The lathe tool is moved by the moving device along a predetermined path relative to the worktable to machine curved surfaces of the top portion of the metallic member. The scraping cutter is moved to contact the peripheral sidewall of the metallic member. The scraping cutter is moved along a predetermined path, and the scraping cutter is fed the metallic member to achieve the required shape and finish.

18 Claims, 8 Drawing Sheets

METHOD FOR MACHINING METALLIC MEMBER USING LATHING AND SCRAPING

CROSS-REFERENCE TO RELATED APPLICATIONS

This application claims all benefits accruing under 35 U.S.C. §119 from China Patent Application No. 201210553821.9, filed on Dec. 19, 2012, in the China Intellectual Property Office, the disclosure of which is incorporated herein by reference. The application is also related to co-pending applications entitled, "METHOD FOR MACHINING METALLIC MEMBER USING LATHING AND MILLING" Ser. No. 14/070,671; "METHOD FOR MACHINING METALLIC MEMBER USING LATHING AND MILLING" Ser. No. 14/070,681; "METHOD FOR MACHINING METALLIC MEMBER USING LATHING AND SCRAPING" Ser. No. 14/070,694; "METHOD FOR MACHINING METALLIC MEMBER USING LATHING AND SCRAPING" Ser. No. 14/070,699; "MACHINE TOOL WITH LATHE TOOL AND MILLING CUTTER" Ser. No. 14/070,705; "MACHINE TOOL WITH LATHE TOOL AND SCRAPING CUTTER" Ser. No. 14/070,717; "MACHINE CONTROL SYSTEM EMPLOYING LATHE TOOL AND MILLING CUTTER" Ser. No. 14/070,722; "MACHINE CONTROL SYSTEM EMPLOYING LATHE TOOL AND SCRAPING CUTTER" Ser. No. 14/070,728, "MILLING METHOD FOR MACHINING METALLIC MEMBER" Ser. No. 14/070,736.

BACKGROUND

1. Technical Field

The present disclosure generally relates to methods for machining a metallic member, and particularly, to a method for machining member using lathing and scraping.

2. Description of the Related Art

An electronic device such as a tabletop computer or a mobile phone may have a housing made of metal. The metallic housing includes a top portion and a peripheral sidewall extending from a peripheral edge of the top portion. The top portion has a greater surface area than that of the peripheral sidewall and has a non-circular flat surface or non-circular curved surface. The peripheral sidewall has four side surfaces arranged in order and adjacent two side surfaces connected by corners. In related manufacturing fields, if a milling process is used to machine the metallic housing, some tracks may occur on the top portion that has been milled because of intermittent contact and interrupted milling by the milling cutter. Then a second milling process needs to be applied for a better appearance. Thus the efficiency of the milling process is reduced. If a lathe process is used to machine the metallic member, it is difficult to machine a surface which is not circular. The lathe is not suitable to machine the peripheral sidewalls because of the four corners of the peripheral sidewall. Thus a number of additional machining processes are needed to machine the metallic housing.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
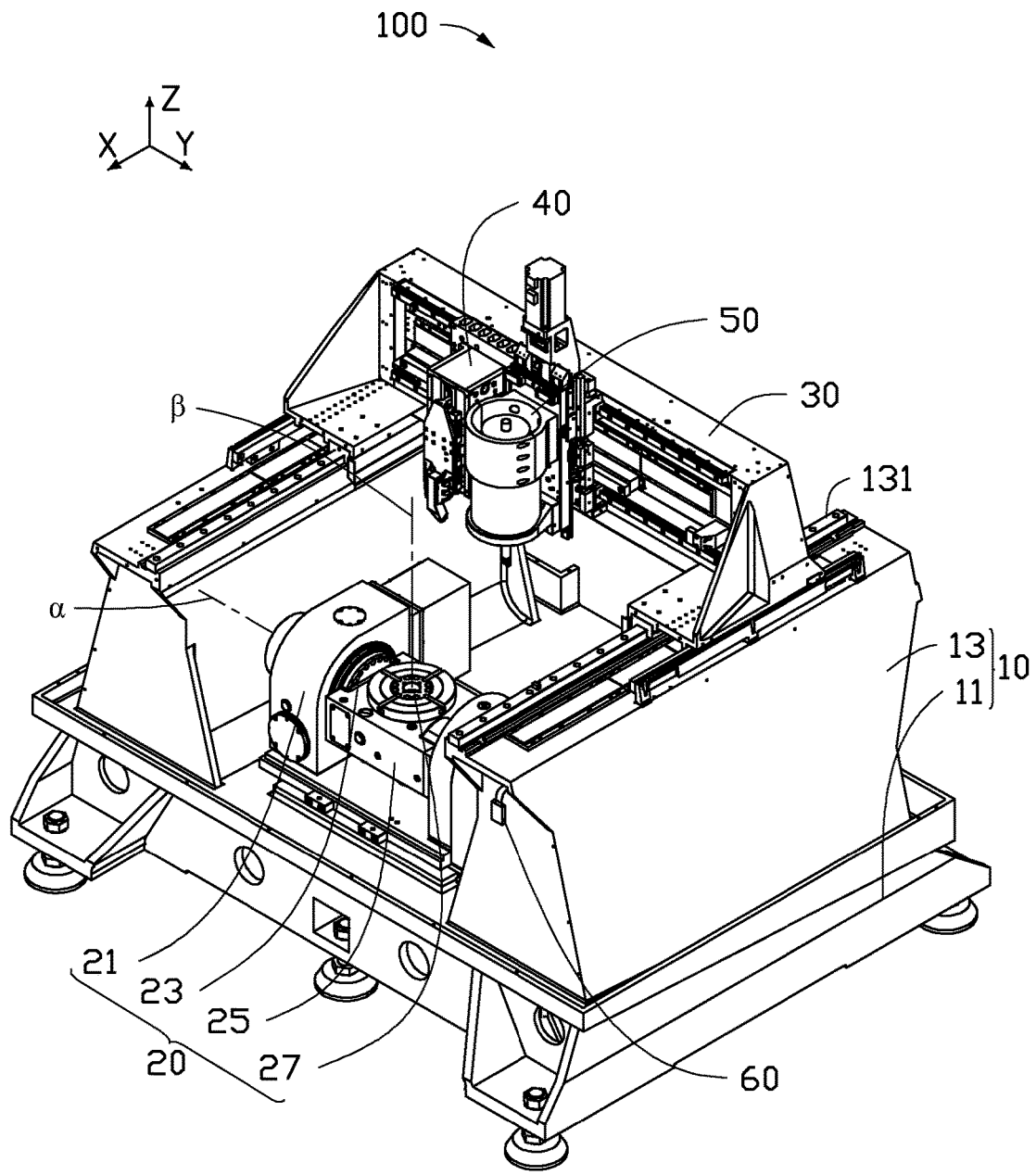
FIG. 1 is an isometric view of a first embodiment of a machine equipped with a lathe feeding mechanism and a scraping feeding mechanism, and a worktable.
Figure 2:
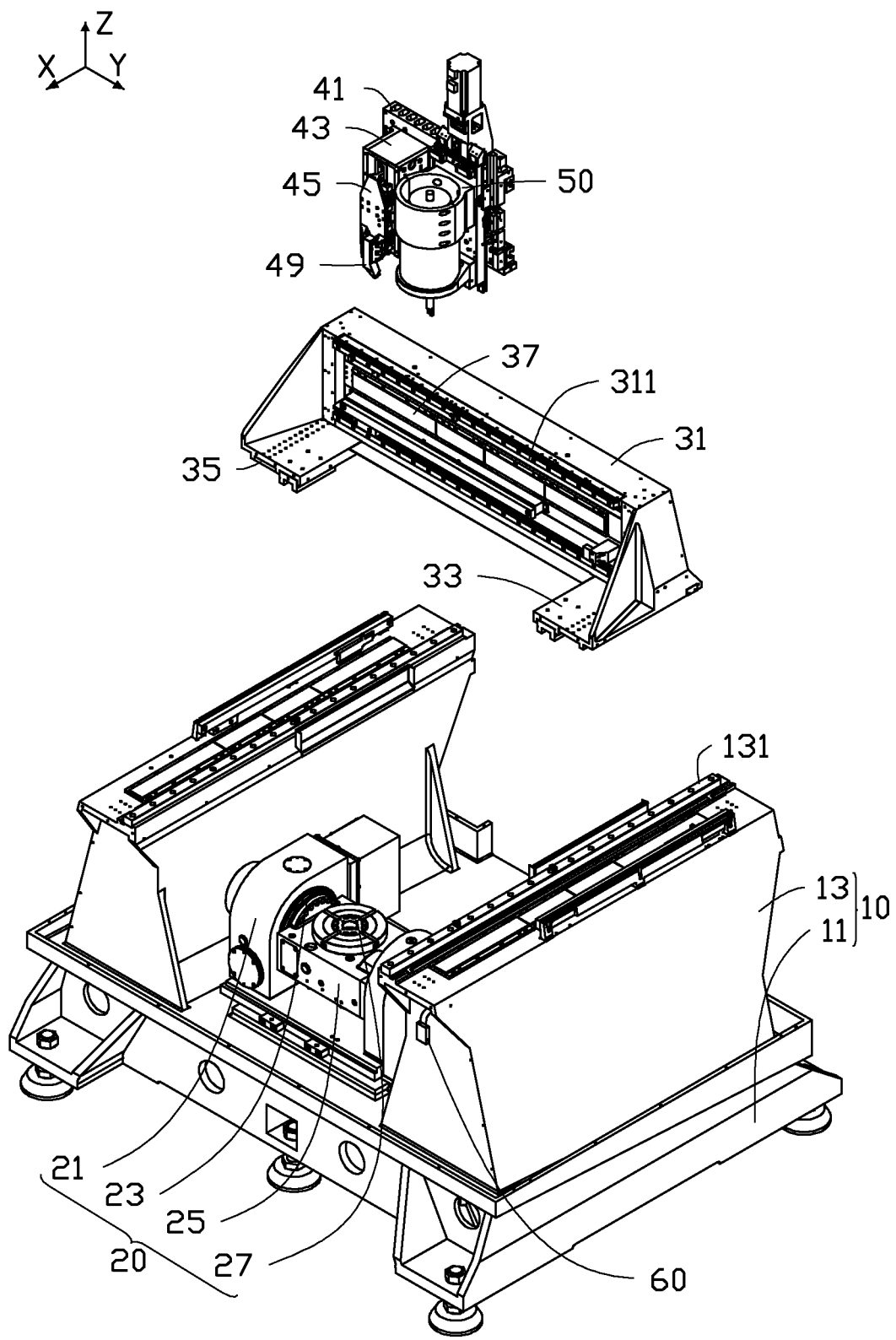
FIG. 2 is an exploded, isometric view of the machine of FIG. 1.
Figure 5:
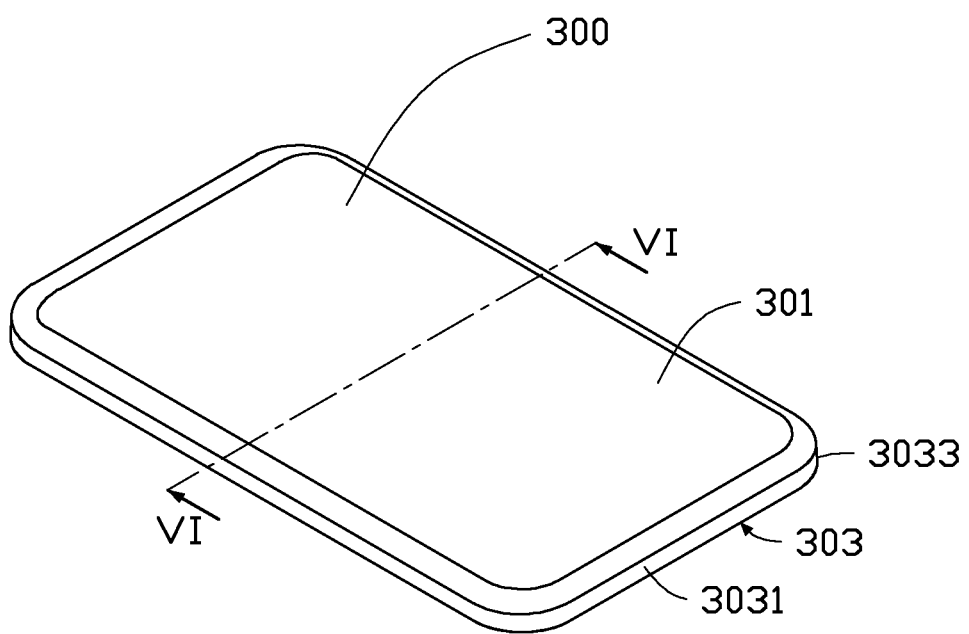
FIG. 5 is an isometric view of a metallic member to be machined.

FIGS. 1 and 2 show a first embodiment of a machine 100 adapted for a scraping method for machining a metallic member 300 (see FIG. 5). The machine 100 includes a machine support 10, a worktable 20, a moving device 30, a lathe feeding mechanism 40, a scraping feeding mechanism 50, and a controller 60. The worktable 20 holds a workpiece in place and is supported by the machine support 10. The moving device 30 is movably positioned on the machine support 10 above the worktable 20. The lathe feeding mechanism 40 and the scraping feeding mechanism 50 are arranged side by side and slidably mounted on the moving device 30. The controller 60 is electrically connected to the worktable 20, the moving device 30, the lathe feeding mechanism 40, and the scraping feeding mechanism 50 for controlling the machine 100. Under the control of the controller 60, the moving device 30 can be driven to move with the lathe feeding mechanism 40 and the scraping feeding mechanism 50, such that the lathe feeding mechanism 40 and the scraping feeding mechanism 50 can be driven three-dimensionally along Cartesian coordinates, that is, along the X, the Y, and the Z axes.

The machine support 10 includes a base 11 and a pair of support bodies 13 positioned on the base 11. The pair of support bodies 13 is parallel to each other and arranged apart. Each support body 13 includes a first sliding rail 131 on a surface away from the base 11. In the illustrated embodiment, the first sliding rail 131 extends substantially parallel to the X-axis (a first direction).

The worktable 20 is rotatably positioned on the base 11 between the two support bodies 13. The worktable 20 includes a pair of mounting bases 21, a first rotating member 23, a rotating shaft 25, and a second rotating member 27. The pair of mounting bases 21 is located in the middle portion of the base 11, in parallel. The pair of mounting bases 21 is located between the two support bodies 13. The first rotating member 23 is mounted on one mounting base 21. The rotating shaft 25 interconnects the first rotating member 23 and the other one mounting base 21. The first rotating member 23 is capable of rotating the rotating shaft 25 around an α axis. The α axis is parallel to the Y-axis but is not co-linear (a second direction). The second rotating member 27 is positioned on a middle portion of the rotating shaft 25, and capable of rotating the metallic member 300 placed thereupon around a β axis. The β axis is parallel to the Z-axis (a third direction) but is not co-linear. The first rotating member 23 and the second rotating member 27 are electrically connected to the controller 60. In the illustrated embodiment, the first rotating member 23 and the second rotating member 27 are direct drive motors.

The moving device 30 is slidably mounted on the pair of support bodies 13 and located above the worktable 20. The moving device 30 includes a cross beam 31, a pair of sliding bases 33, a pair of first driving mechanisms 35, and a second driving mechanism 37. The extending direction of the cross beam 31 is substantially parallel to the Y-axis. Opposite ends of the cross beam 31 are slidably positioned on the support bodies 13. The cross beam 31 includes a pair of second sliding rails 311 positioned on a side surface and extending substantially parallel to the Y-axis. The pair of sliding bases 33 is installed on the opposite ends of the cross beam 31 to slidably connect with the first sliding rail 131. The first driving mechanism 35 is mounted on a surface of the sliding base 33 away from the cross beam 31 and located adjacent to an end of the first sliding rail 131. The pair of first driving mechanisms 35 is employed to drive the cross beam 31 to move along the X-axis direction.

The second driving mechanism 37 is mounted on the cross beam 31 to drive the lathe feeding mechanism 40 and the scraping feeding mechanism 50 to move along the second sliding rails 311. The first driving mechanisms 35 and the second driving mechanism 37 are electrically connected to the controller 60. In the illustrated embodiment, the first driving mechanisms 35 and the second driving mechanism 37 are high performance linear motors. In other embodiments, the first driving mechanisms 35 and the second driving mechanism 37 may be other drivers, such as hydraulic cylinders or rams. The number of the first driving mechanisms 35, and the second driving mechanism 37 may be set according to the application.

Figure 3:
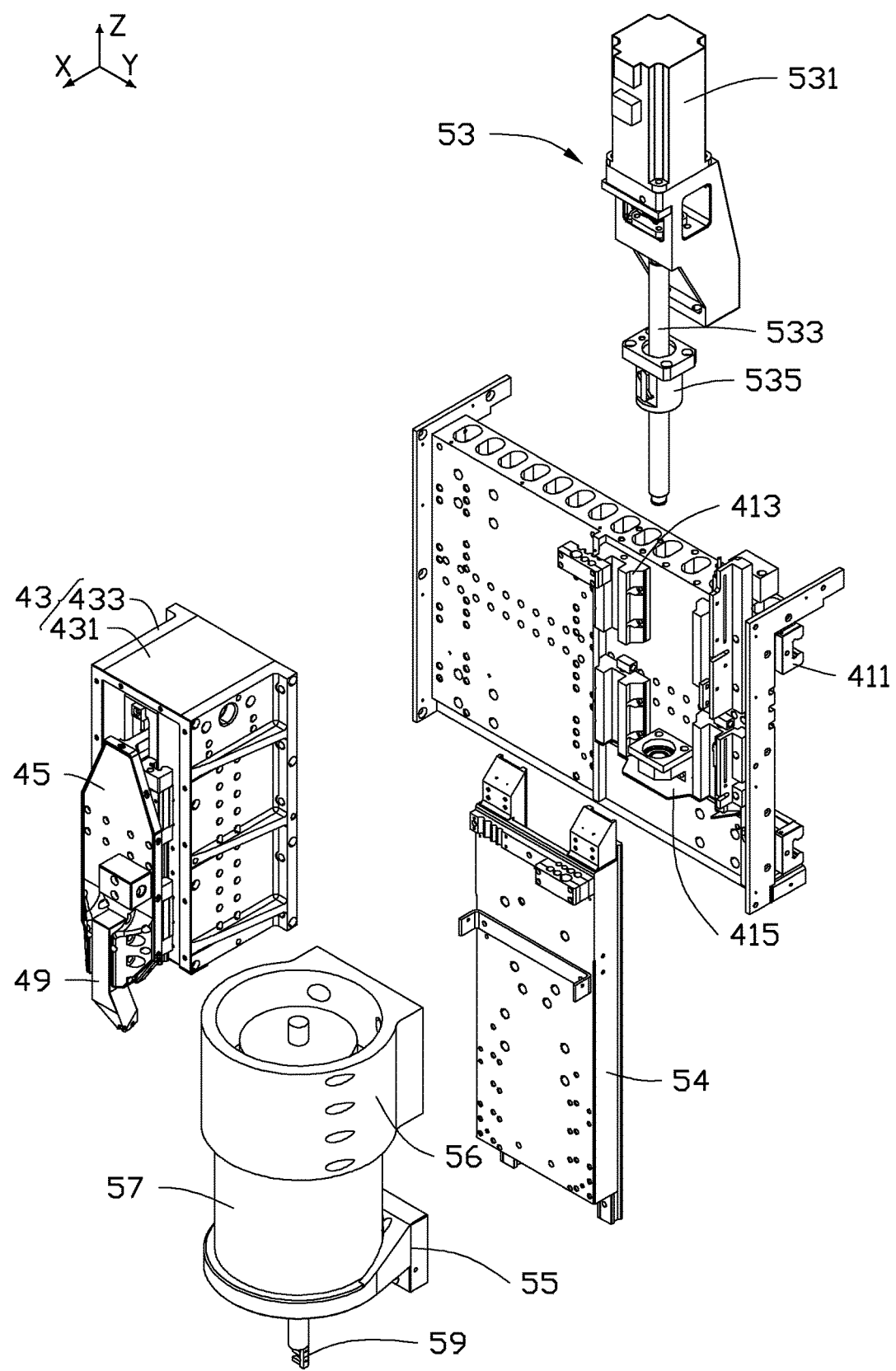
FIG. 3 is a partial, exploded, isometric view of the lathe feeding mechanism and the scraping feeding mechanism of FIG. 2.
Figure 4:
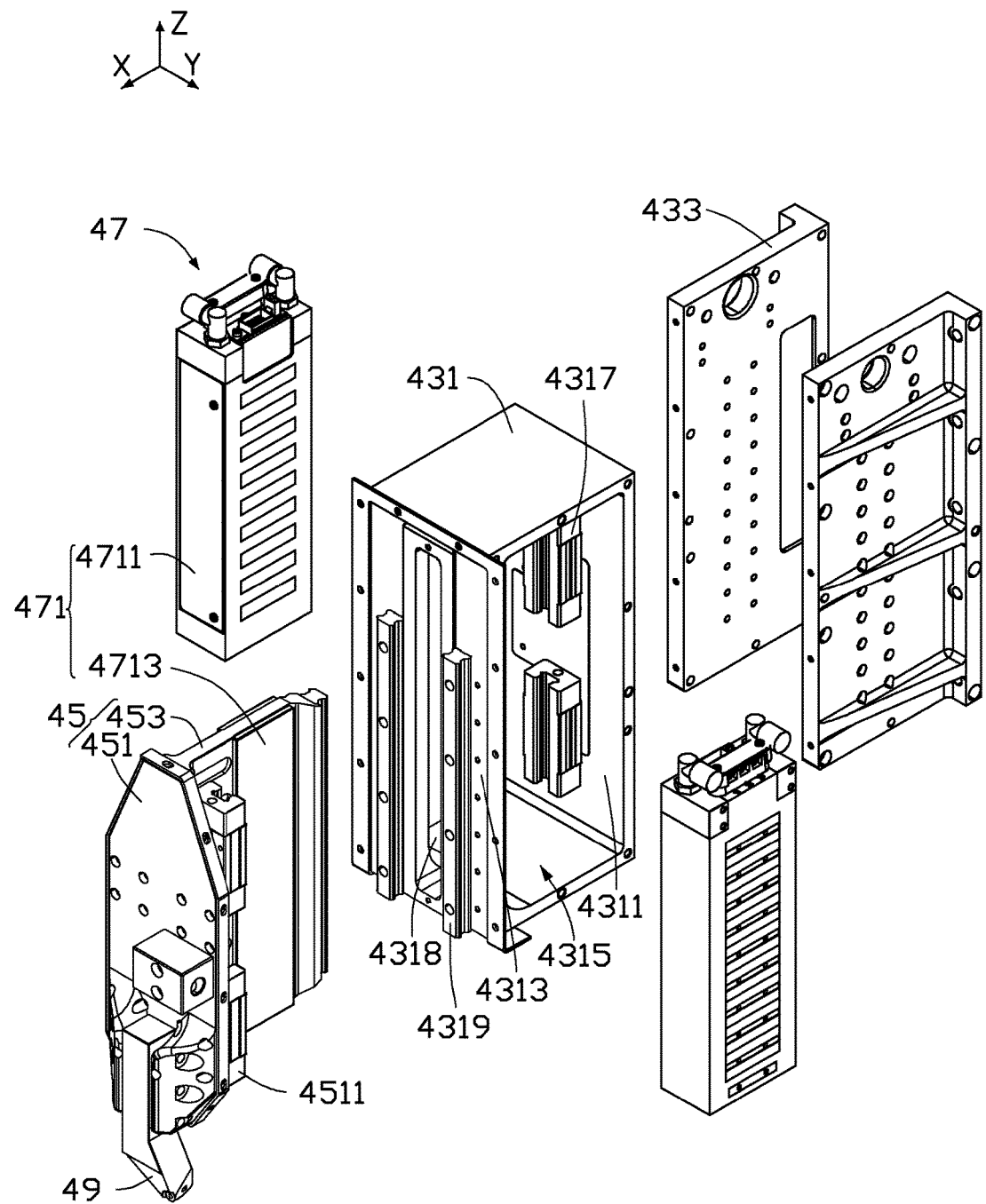
FIG. 4 is an exploded, isometric view of the lathe feeding mechanism of FIG. 3.

FIGS. 3 to 4 show the lathe feeding mechanism 40 slidably positioned on the cross beams 31. The lathe feeding mechanism 40 includes a sliding saddle 41 (see FIG. 2), a mounting seat 43, a tool holder 45, a pair of feeding assemblies 47, and a lathe tool 49. The sliding saddle 41 is assembled to the cross beams 31 and movably engages with the pair of second sliding rails 311. The sliding saddle 41 is driven by the second driving mechanism 37 to slide along the Y-axis direction together with the lathe feeding mechanism 40 and the scraping feeding mechanism 50. The mounting seat 43 is fitted to the sliding saddle 41 away from the cross beam 31 and equipped with four guiding rails 413 extending along the Z-axis direction. The four guiding rails 413 are divided in two sets spaced from each other in pairs. The sliding saddle 41 further includes a mounting block 415 adjacent to the base 11. The mounting block 415 is located between the two sets of guiding rails 413. The mounting seat 43 is assembled to the sliding saddle 41 and spaced from the four guiding rails 413.

The mounting seat 43 includes a frame 431 and two mounting boards 433 assembled to opposite sides of the frame 431. The frame 431 includes a first side wall 4311 and a second side wall 4313. The first side wall 4311 and the second side wall 4313 are positioned substantially parallel to each other and cooperatively define a receiving space 4315. The first side wall 4311 is slidably connected with the sliding saddle 41. Two separate guiding portions 4317 protrude from an inner surface of the first side wall 4311 facing the second side wall 4313 and extending substantially parallel to the Z-axis. A through groove 4318 is defined in the second side wall 4313 and extends along a direction substantially parallel to the Z-axis corresponding to the guiding portions 4317. Two sliding portions 4319 protrude from an outer surface of the second side wall 4313 at two sides of the through groove 4318. In the illustrated embodiment, the sliding portions 4319 are sliding rails, and the frame 431 is integrally formed. The two mounting boards 433 are installed on opening sides of the frame 431. Each of the two mounting board 433 is connected substantially perpendicularly to the first side wall 4311 and the second side wall 4313 to close the two opening sides of the frame 431.

The tool holder 45 slidably connects with the mounting seat 43. The tool holder 45 is substantially "T" shaped, and includes a main body 451 and a sliding board 453 protruding substantially perpendicularly from the main body 451. The main body 451 is a bar of material tapering at both ends, and positioned outside of the mounting seat 43. Two distanced holding portions 4511 are positioned on a surface of the main body 451 facing the sliding board 453. The two holding portions 4511 slidably engage with the pair of sliding portions 4319 of the mounting seat 43. The sliding board 453 passes through the through groove 4318 and is slidably assembled to the two guiding portions 4317, dividing the receiving space 4315 into two parts.

The pair of feeding assemblies 47 is mounted in the mounting seat 43, and includes two drivers 471 electrically connected to the controller 60. The two drivers 471 are capable of driving the tool holder 45 to reciprocal motions at high speed along the direction of the Z-axis, relative to the guiding portions 4317 and the sliding portions 4319. The two drivers 471 are received in the receiving space 4315 and positioned on two sides of the sliding board 453. In the illustrated embodiment, the drivers 471 are linear motors. Each driver 471 includes a forcer 4711 and a stator 4713. Each forcer 4711 is fixed to a surface of each of the mounting boards 433. The sliding board 453 is positioned between the two forcers 4711. The two stators 4713 are positioned on the opposite surfaces of the sliding board 453. In other embodiments, the number of drivers 471 may be set according to application. For example, the two drivers 471 can replace a more powerful single driver, or three or more drivers can be positioned to drive the tool holder 45 to maximize the available power, and the assembly of the drivers is simpler.

The lathe tool 49 is fixedly assembled to the main body 451 of the tool holder 45 adjacent to the base 11.

The scraping feeding mechanism 50 includes a linear driving assembly 53, a linking board 54, a fixing seat 55, a mounting base 56, a rotatable driving member 57 and a scraping cutter 59. The linear driving assembly 53 includes a driving member 531, a screw leading rod 533, and a nut 535. The driving member 531 is mounted on the sliding saddle 41 above the cross beam 31. The screw leading rod 533 interconnects the driving member 531 and the mounting block 415. The nut 535 is sleeved on the screw leading rod 533 and engages with the screw leading rod 533. The linking board 54 is slidably assembled to the two sets of guiding rails 413 and fixed to the nut 535. The fixing seat 55 is mounted on an end of the linking board 54 adjacent to the base 11. The mounting base 56 is mounted on an end of the linking board 54 opposite to the fixing seat 55. The rotatable driving member 57 extends through the fixing seat 55 and the mounting base 56, and is fittingly supported by the fixing seat 55. The scraping cutter 59 is mounted on an end of the rotatable driving member 57 adjacent to the base 11.

The driving member 531 is capable of rotating the screw leading rod 533 and drives the linking board 54, the rotatable driving member 57, and the scraping cutter 59 to slide along Z-axis direction. The rotatable driving member 57 is capable of rotating the scraping cutter 59. The scraping cutter 59 is driven by the cross beam 31 to move along the X-axis direction or the Y-axis direction, and driven by the linear driving assembly 53 to move along Z-axis direction.

In assembly, the worktable 20 is positioned between the two support bodies 13. The cross beam 31 is installed on the two support bodies 13 via the pair of sliding bases 33. The pair of first driving mechanisms 35, and the second driving mechanism 37 are mounted on the base 11 and the cross beam 31 respectively. The lathe feeding mechanism 40 and the scraping feeding mechanism 50 are mounted to the cross beam 31 side by side. The worktable 20, the moving device 30, the lathe feeding mechanism 40, and the scraping feeding mechanism 50 are electrically connected to the controller 60.

Figure 6:
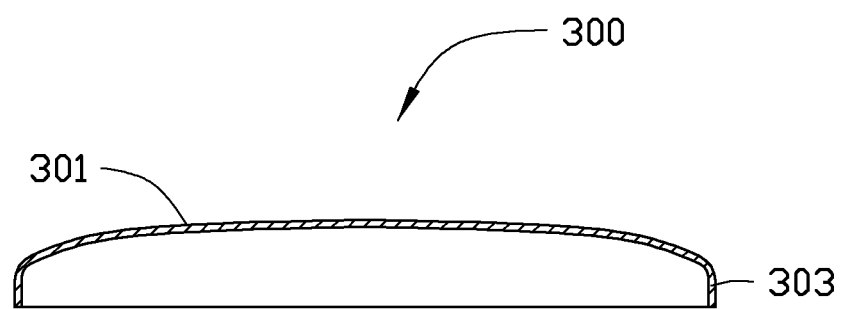
FIG. 6 is a sectional view of the metallic member of FIG. 5, taken along line VI-VI of FIG. 5.

FIGS. 5 and 6 show that the metallic member 300 to be machined is a housing of a tablet computer or a mobile phone. The metallic member 300 is substantially rectangular and hollow, and includes a top portion 301 and a peripheral sidewall 303 extending from a peripheral edge of the top portion 301. The top portion 301 has a curved surface with a relatively greater surface area than that of the peripheral sidewall 303. In the embodiment, the peripheral sidewall 303 has four side surfaces 3031 arranged in order and every two of the adjacent side surfaces 3031 are connected by a corner 3033. The four side surfaces 3031 are substantially flat surfaces, each corner 3033 interconnects two adjacent side surfaces 3031. The peripheral sidewall 303 further includes an end edge 305 away from the top portion 301.

Figure 7:
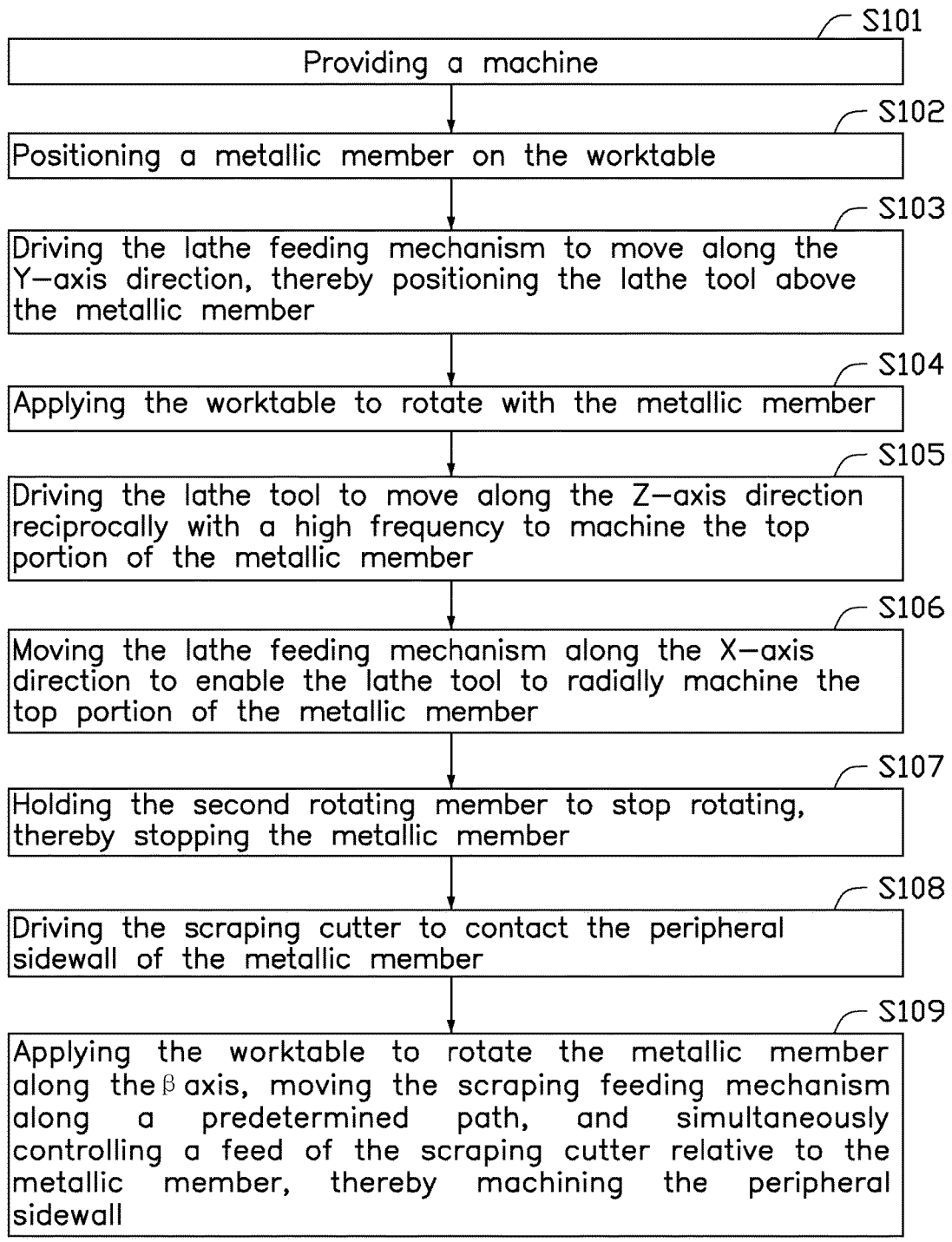
FIG. 7 is a flow chart of a first embodiment of the method for machining the metallic member.

FIG. 7 shows that a method for machining the metallic member includes steps as follows:

In step S101: a machine 100 is provided, the machine 100 includes a worktable 20, a lathe feeding mechanism 40, and a scraping feeding mechanism 50, the lathe feeding mechanism 40 includes a lathe tool 49, and the scraping feeding mechanism 50 includes a scraping cutter 59. In the embodiment, the machine 100 is provided as previously described.

In step S102: a metallic member 300 is placed and held on the worktable 20 of the machine 100. The metallic member 300 includes a top portion 301 and a peripheral sidewall 303 extending from a peripheral edge of the top portion 301.

In step S103: the second driving mechanism 37 drives the lathe feeding mechanism 40 to move along the Y-axis, thereby positioning the lathe tool 49 at an original position above the metallic member 300.

In step S104: the second rotating member 27 rotates the metallic member 300 around the β axis;

In step S105: the lathe feeding mechanism 40 drives the lathe tool 49 to move along the Z-axis reciprocally with a high frequency to machine the top portion 301 of the metallic member 300 according to the depth of cutting required for each machining portion of the top portion 301, thereby machining the rotary metallic member 300 circumferentially.

In step S106: the moving device 30 moves the lathe feeding mechanism 40 along the X-axis to enable the lathe tool 49 to radially machine the top portion 301 of the metallic member 300.

In step S107: the second rotating member 27 is held to stop rotating, the metallic member 300 stops rotating, and the lathe tool 49 stops working.

In step S108: the scraping feeding mechanism 50 drives the scraping cutter 59 to contact the peripheral sidewall 303 of the metallic member 300. In detail, first, the pair of first driving mechanisms 35 drives the cross beam 31 to slide along the X-axis, and the second driving mechanism 37 drives the scraping feeding mechanism 50 to move along the Y-axis, such that the scraping cutter 59 moves toward one first sliding rail 131 and arrives at a position above an end of one side surface 3031 of the peripheral sidewall 303. Second, the linear driving assembly 53 drives the scraping cutter 59 to slide along the two sets of guiding rails 413 until the scraping cutter 59 meets the peripheral sidewall 303 of the metallic member 300.

In step S109: the worktable 20 rotates the metallic member 300 along the β axis, the scraping feeding mechanism 50 moves along a predetermined path, and simultaneously with the metallic member 300 controls a feed of the scraping cutter 59 relative to the metallic member 300, thereby machining the peripheral sidewall 303. In detail, the pair of first driving mechanisms 35 drives the cross beam 31 to slide along the X-axis to enable the scraping cutter 59 to scrap the one side surface 3031 of the peripheral sidewall 303. When the scraping cutter 59 arrives at the corner 3033, the second rotating member 27 rotates the metallic member 300 around the β axis, the pair of first driving mechanisms 35 and the second driving mechanism 37 drive the scraping cutter 59 to adjust a feeding direction. The rotatable driving member 57 rotates the scraping cutter 59 to scrap the corner 3033 along a tangent line of the outer surface of the corner 3033. The second rotating member 27 rotates the metallic member 300 to a preset angle, the moving device 30 drives the scraping feeding mechanism 50 to enable the scraping cutter 59 to scrape the next side surface 3031 straight. Finally, in the same way the scraping cutter 59 finishes scraping the peripheral sidewall 303. In other embodiments, the second rotating member 27 continuously rotates the metallic member 300 around the β axis, the scraping feeding mechanism 50 is moved by the moving device 30 to move along the metallic member 300 in a straight line, and simultaneously control a movement of the scraping cutter 59.

The scraping feeding mechanism 50 may scrap the peripheral sidewall 30 first, then the lathe feeding mechanism 40 drives the lathe tool 49 to machine the top portion 301 of the metallic member 300.

In other embodiments, the sliding saddle 41, the mounting seat 43, the tool holder 45 may be omitted. Other driving assemblies assembled to the pair of second guiding rails 311 may be substituted for the pair of feeding assemblies 47. The driving assembly is capable of directly reciprocating the lathe tool 49 along the Z direction at a high speed.

The scraping feeding mechanism 50 may not be assembled to the sliding saddle 41, but assembled to a sliding plate (not shown) slidably mounted on the pair of second guiding rails 311, such that the lathe feeding mechanism 40 and the scraping feeding mechanism 50 may be controlled independently.

The driving member 531, the screw leading rod 533, and the nut 535 may be substituted by other driving assembly, such as a linear cylinder. The linear cylinder is assembled to the pair of second guiding rails 311. The rotatable driving member 57 is mounted on an output shaft of the linear cylinder. Accordingly, the linking board 54 of the scraping feeding mechanism 50 may be omitted.

The worktable 20 may include the second rotating member 27 only, the second rotating member 27 is assembled to the base 11, and rotates around the β axis only. The worktable 20 may be a multi-axis worktable, and rotates the metallic member 300 along a plurality of axis to enable a multi-workstations machining.

Figure 8:
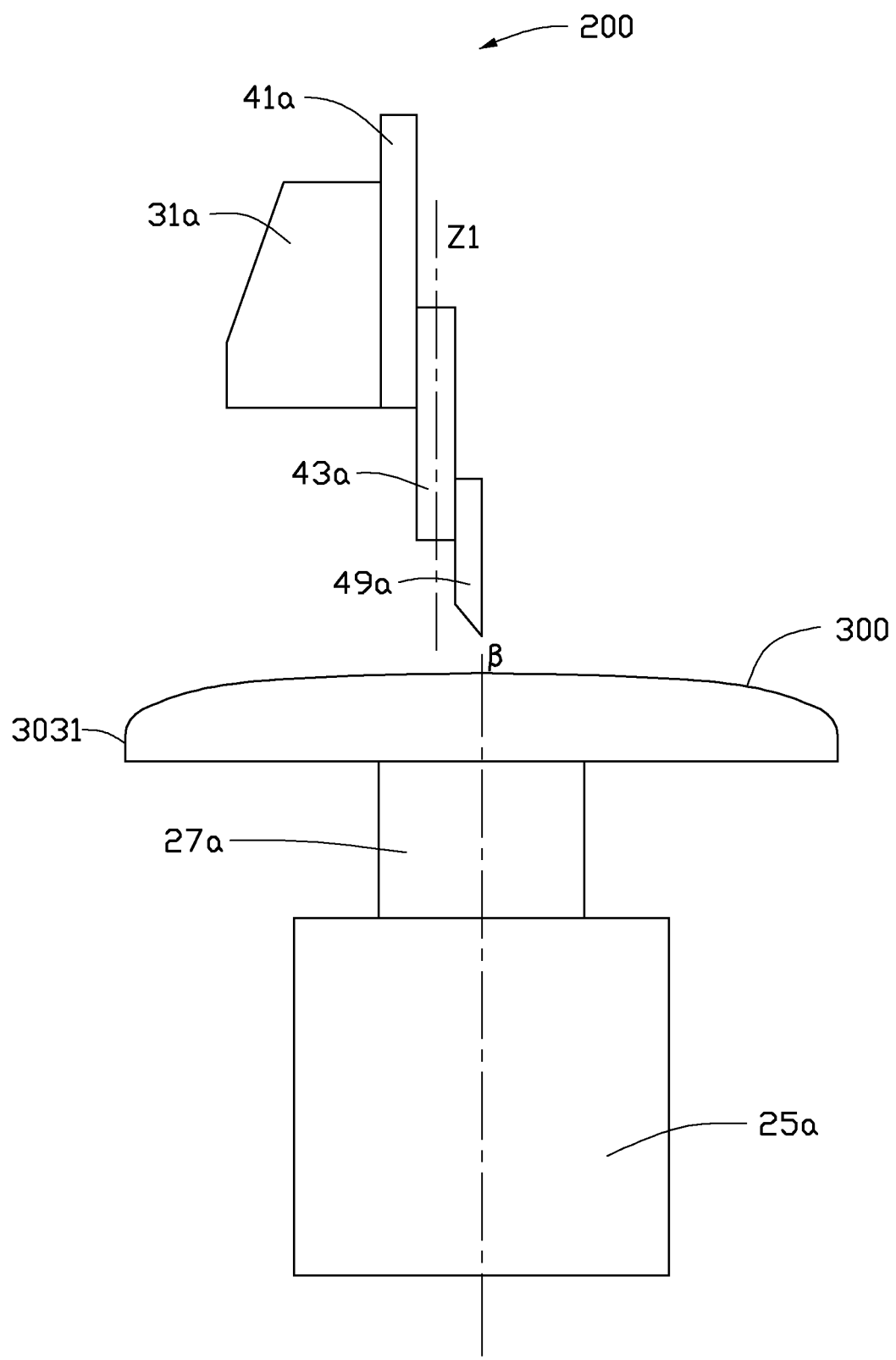
FIG. 8 is a schematic view of a second embodiment of the machine with a part thereof removed.

FIG. 8 shows that a second embodiment of machine 200 is employed in a second embodiment of method for machining the metallic member 300. The machine 200 is similar to the machine 100 in structure, save that a sliding saddle 41a is slidably assembled to a cross beam 31a, and a second rotating member 27a is mounted on a rotating shaft 25a. The metallic member 300 is placed and held on the second rotating member 27a. The difference between the machines 100/200 is that, a mounting seat 43a of the machine 200 is slidably mounted on the sliding saddle 41a and capable of sliding along the Z1-axis direction relative to the sliding saddle 41a, and a lathe tool 49 is slidably mounted on the mounting seat 43a.

When the lathe feeding mechanism 40 machines the top portion 301 of the metallic member 300, the pair of first driving mechanisms 35 drive the cross beam 31 to slide along the X-axis. In addition, the second driving mechanism 37 drives the lathe feeding mechanism 40 to move along the Y-axis, such that the lathe tool 49 arrives at an original position above the worktable 20 for machining. The original position is located at a middle of a side of the top portion 301. Then the mounting seat 43a drives the lathe tool 49 to move downward along the Z1-axis to reach a preset position near the metallic member 300. Finally, the pair of feeding assemblies 47 drives the lathe tool 49 to reciprocate at a high speed along the Z-axis according to the depth of cutting required for each machined portion of the top portion 301, to machine the rotary metallic member 300 circumferentially. Because the mounting seat 43a can slide along the Z1-axis to place the lathe tool 49 at the preset position, a reciprocating distance of movement of the lathe tool 49 relative to the metallic member 300 can be reduced, thereby enhancing a reaction response of the lathe tool 49.

Accordingly, in the second embodiment of the method for machining the metallic member 300, after driving the cross beam 31 to slide along the Y-axis by the second driving mechanisms 37, a sub-step of moving the mounting seat 43a downward along the Z1-axis direction to reach a preset position is interposed.

The scraping feeding mechanism 50 is not assembled to the sliding saddle 41, but is assembled to a sliding plate (not shown) slidably mounted on the pair of second guiding rails 311, such that the lathe feeding mechanism 40 and the scraping feeding mechanism 50 may be controlled independently.

The moving device 30 is capable of moving the lathe feeding mechanism 40 along X/Y-axis directions, and the lathe feeding mechanism 40 is capable of reciprocating the lathe tool 49 along the Z-axis at a high speed, the scraping feeding mechanism 50 scrapes the peripheral sidewall 303, thereby accomplishing the one time machining of the metallic member 300. The worktable 20 is capable of rotating the metallic member 300 to match the feed of the lathe feeding mechanism 40. In addition, the lathe feeding mechanism 40 is capable of moving along the Y-axis direction, such that a uninterrupted machine is achieved, the finish of top portion 301 of the metallic member 300 is enhanced, and the machining process is time saving. The scraping cutter 59 scrapes the corner 3033 along the tangent line, such that a finish is enhanced. The worktable 20 is capable of rotating along the α axis and the β axis to conveniently facilitate the scraping cutter 59 machining of the metallic member 300.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:
1. A machining method for machining metallic member using lathing and scraping, comprising:

(1) providing a machine comprising a machine support, a worktable for rotating the metallic member, a moving device, a lathe feeding mechanism, and a scraping feeding mechanism, wherein the worktable is positioned on the machine support;
wherein the moving device is slidably assembled to the machine support to slide along a first direction while being located above the worktable;
wherein the lathe feeding mechanism and the scraping feeding mechanism are slidably assembled to the moving device to slide along a second direction perpendicular to the first direction, the lathe feeding mechanism comprises at least one feeding assembly and a lathe tool, with the lathe tool connected to the at least one feeding assembly;
wherein the at least one feeding assembly drives the lathe tool to move reciprocally along a third direction substantially perpendicular to the first and second directions;
wherein the lathe tool moves according to a depth of cutting required for a machined portion to machine the metallic member circumferentially thereby reducing a reciprocating distance of a movement of the lathe tool relative to the metallic member,
wherein the lathe feeding mechanism further comprises a sliding saddle slidably connected to the moving device to slide along the second direction, and a mounting seat assembled to the sliding saddle, the mounting seat comprises a frame including a first side wall and a second side wall spaced apart from the first side wall, the first side wall and the second side wall together define a receiving space; wherein a through groove is defined in the second side wall;
wherein the lathe feeding mechanism further comprises a substantially T-shaped tool holder including a main body and a sliding board, the lathe tool is mounted to the substantially T-shaped tool holder, the sliding board extends through the through groove and is slidably engaged with the first side wall for movement in the third direction, and the main body comprises a holding portion slidably engaged with the second side wall for movement in the third direction, the scraping feeding mechanism comprises a scraping cutter and is configured for driving the scraping cutter to move along the third direction;
(2) positioning a metallic member on the worktable, the metallic member comprising a top portion having a peripheral edge, and a peripheral sidewall extending from the peripheral edge of the top portion, the peripheral sidewall comprising an end edge facing away from the top portion;
(3) moving the lathe tool by the moving device to the top portion of the metallic member;
(4) applying the worktable to rotate with the metallic member along a first axis parallel to the third direction;
(5) controlling the lathe tool to move back and forth toward the metallic member to machine the top portion of the metallic member circumferentially;
(6) moving the lathe tool by the moving device along a predetermined path relative to the worktable to machine curved surfaces of the top portion of the metallic member;
(7) holding the metallic member to stop from rotating, and moving the lathe tool away from the metallic member;
(8) the moving device drives the scraping cutter to contact the peripheral sidewall of the metallic member; and (9) applying the worktable to rotate the metallic member along an axis parallel to the third direction, moving the scraping cutter along a predetermined path to scrap the peripheral sidewall of the metallic member, and simultaneously controlling a feed of the scraping cutter relative to the metallic member.

2. The method of claim 1, wherein in step (9), the worktable rotates the metallic member along an axis parallel to the third direction, and the moving device drives the scraping feeding mechanism to move according to the movement of the worktable, thereby enabling the scraping cutter to contact the peripheral sidewall continuously during scraping.

3. The method of claim 1, wherein the scraping feeding mechanism further comprises a rotatable driving member configured for driving the scraping cutter to rotate along an axis parallel to the third direction, and wherein the peripheral sidewall of the metallic member comprises a plurality of side surfaces arranged in order, wherein each adjacent two of the plurality of side surfaces connect to each other at a corner of the metallic member, and wherein step (9) further comprising, wherein when the scraping cutter arrives at the corner, the worktable rotates the metallic member along an axis parallel to the third direction, and the rotatable driving member drives the scraping cutter to scrap the corner, then the worktable rotates the metallic member along the axis parallel to the third direction until the scraping cutter arrives at a side surface adjacent to the side surface that has been scraped, then followed by repeating the machining steps on the adjacent side surface.

4. The method of claim 3, wherein when the scraping cutter is scraping the corner, the worktable rotates the metallic member along the axis parallel to the third direction, the rotatable driving member rotates the scraping cutter to enable the scraping cutter to scrape the corner along a tangent line of an outer surface of the corner.

5. The method of claim 3, wherein the feeding assembly is received in the mounting seat, and the scraping feeding mechanism is adjacent to the mounting seat.

6. The method of claim 5, wherein the scraping feeding mechanism further comprises a linear driving assembly and a linking board, the linear driving assembly comprises a driving member, a screw leading rod, and a nut, the driving member of the linear driving assembly is mounted on the sliding saddle, the sliding saddle comprises a mounting block, the screw leading rod rotatably interconnects the driving member of the linear driving assembly and the mounting block, the nut is sleeved on and engages with the screw leading rod, the linking board is fixed to the nut and slidably engaged with the sliding saddle, and the rotatable driving member is mounted on the linking board.

7. The method of claim 6, wherein the sliding saddle comprises two sets of guiding rails along the third direction, and the linking board is slidably assembled to each of the two sets of guiding rails.

8. The method of claim 5, wherein the mounting seat comprises two separate guiding portions mounted on the first side wall along the third direction, the tool holder is slidably assembled to the two separate guiding portions mounted on the first side wall.

9. The method of claim 1, wherein in step (8), when the scraping feeding mechanism arrives at the peripheral sidewall, the scraping feeding mechanism drives the scraping cutter to slide along the third direction to enable the scraping cutter to resist the peripheral sidewall.

10. A method for machining metallic member using lathing and scraping, comprising:

(1) providing a machine comprising a machine support, a worktable for rotating the metallic member, a moving device, a lathe feeding mechanism, and a scraping feeding mechanism, wherein the worktable is positioned on the machine support;

wherein the moving device is slidably assembled to the machine support to slide along a first direction while being located above the worktable;

wherein the lathe feeding mechanism and the scraping feeding mechanism are slidably assembled to the moving device to slide along a second direction perpendicular to the first direction, the lathe feeding mechanism comprises at least one feeding assembly and a lathe tool, with the lathe tool connected to the at least one feeding assembly;

wherein the at least one feeding assembly drives the lathe tool to move reciprocally along a third direction substantially perpendicular to the first and second directions, wherein the lathe tool moves according to a depth of cutting required for a machined portion to machine the metallic member circumferentially, thereby reducing a reciprocating distance of a movement of the lathe tool relative to the metallic member;

wherein the lathe feeding mechanism further comprises a sliding saddle slidably connected to the moving device to slide along the second direction, and a mounting seat assembled to the sliding saddle, the mounting seat comprises a frame including a first side wall and a second side wall spaced apart from the first side wall, the first side wall and the second side wall together define a receiving space; wherein a through groove is defined in the second side wall;

wherein the lathe feeding mechanism further comprises a substantially T-shaped tool holder including a main body and a sliding board, the lathe tool is mounted to the substantially T-shaped tool holder, the sliding board extends through the through groove and is slidably engaged with the first side wall for movement in the third direction, and the main body comprises a holding portion slidably engaged with the second side wall for movement in the third direction, the scraping feeding mechanism comprises a scraping cutter and is configured for driving the scraping cutter to move along the third direction;

(2) positioning a metallic member on the worktable, the metallic member comprising a top portion having a peripheral edge, and a peripheral sidewall extending from the peripheral edge of the top portion, the peripheral sidewall comprising an end edge facing away from the top portion;

(3) driving the scraping cutter by the moving device to contact the peripheral sidewall of the metallic member;

(4) applying the worktable to rotate the metallic member along an axis parallel to the third direction, moving the scraping cutter along a predetermined path to scrap the peripheral sidewall of the metallic member, simultaneously controlling a feed of the scraping cutter relative to the metallic member;

(5) holding the worktable to stop from rotating, stopping the scraping cutter;

(6) moving the lathe tool by the moving device to the top portion of the metallic member;

(7) applying the worktable to rotate with the metallic member along a first axis parallel to the third direction;

(8) controlling the lathe tool to move back and forth toward the metallic member to machine the top portion of the metallic member circumferentially; and (9) moving the lathe tool by the moving device along a predetermined path relative to the worktable to machine curved surfaces of the top portion of the metallic member.

11. The method of claim 10, wherein in step (4), the worktable rotates the metallic member along an axis parallel to the third direction, and the moving device drives the scraping feeding mechanism to move according to the movement of the worktable, thereby enabling the scraping cutter to contact the peripheral sidewall continuously during scraping.

12. The method of claim 10, wherein the scraping feeding mechanism further comprises a rotatable driving member configured for driving the scraping cutter to rotate along an axis parallel to the third direction, and wherein the peripheral sidewall of the metallic member comprises a plurality of side surfaces arranged in order, wherein each adjacent two of the plurality of side surfaces connect to each other at a corner of the metallic member, and wherein step (4) further comprising, wherein when the scraping cutter arrives at the corner, the worktable rotates the metallic member along an axis parallel to the third direction, and the rotatable driving member drives the scraping cutter to scrap the corner, then the worktable rotates the metallic member along the axis parallel to the third direction until the scraping cutter arrives at a side surface adjacent to the side surface that has been scraped, then followed by repeating the machining steps on the adjacent side surface.

13. The method of claim 12, wherein when the scraping cutter is scraping the corner, the worktable rotates the metallic member along the axis parallel to the third direction, the rotatable driving member rotates the scraping cutter to enable the scraping cutter to scrape the corner along a tangent line of an outer surface of the corner.

14. The method of claim 12, wherein the feeding assembly is received in the mounting seat, and the scraping feeding mechanism is adjacent to the mounting seat.

15. The method of claim 14, wherein the scraping feeding mechanism further comprises a linear driving assembly and a linking board, the linear driving assembly comprises a driving member, a screw leading rod, and a nut, the driving member of the linear driving assembly is mounted on the sliding saddle, the sliding saddle comprises a mounting block, the screw leading rod rotatably interconnects the driving member of the linear driving assembly and the mounting block, the nut is sleeved on and engages with the screw leading rod, the linking board is fixed to the nut and slidably engaged with the sliding saddle, the rotatable driving member is mounted on the linking board.

16. The method of claim 15, wherein the sliding saddle comprises two sets of guiding rails along the third direction, the linking board is slidably assembled to each of the two sets of guiding rails.

17. The scraping method of claim 14, wherein the mounting seat comprises two separate guiding portions mounted on the first side wall and extending along the third direction, and wherein the tool holder is slidably assembled to the two separate guiding portions mounted on the first side wall.

18. The method of claim 10, wherein in step (3), when the scraping feeding mechanism arrives at the peripheral sidewall, the scraping feeding mechanism drives the scraping cutter to slide along the third direction to enable the scraping cutter to resist the peripheral sidewall.

* * * * *